(12) United States Patent
Prokopec et al.

(10) Patent No.: US 6,183,008 B1
(45) Date of Patent: Feb. 6, 2001

(54) GAS GENERATOR

(75) Inventors: Norbert Prokopec, Unterneukirchen; Christian Reiter, Aschau/Inn; Robert Wimmer, Altötting, all of (DE)

(73) Assignee: TRW Airbag Systems GmbH & Co. KG, Aschau Inn (DE)

( * ) Notice: Under 35 U.S.C. 154(b), the term of this patent shall be extended for 0 days.

(21) Appl. No.: 09/426,174

(22) Filed: Oct. 22, 1999

(30) Foreign Application Priority Data

Oct. 23, 1998 (DE) .......................................... 298 18 957 U

(51) Int. Cl.⁷ ............................. B60R 21/26; B60R 21/28
(52) U.S. Cl. ..................... 280/736; 280/737; 280/740; 280/741; 102/530
(58) Field of Search ................................. 280/737, 741, 280/736, 740; 102/288, 289

(56) References Cited

U.S. PATENT DOCUMENTS

| | | | |
|---|---|---|---|
| 4,013,010 | * 3/1977 | Schneiter et al. | 102/39 |
| 4,249,673 | * 2/1981 | Katoh et al. | 222/3 |
| 4,578,247 | * 3/1986 | Bolieau | 422/165 |
| 5,024,464 | * 6/1991 | Kawaguchi et al. | 280/731 |
| 5,189,255 | * 2/1993 | Fukabori et al. | 102/531 |
| 5,197,579 | * 3/1993 | Kroiss et al. | 280/736 |
| 5,224,734 | 7/1993 | Swiderski | 280/741 |
| 5,525,306 | * 6/1996 | Schmucker et al. | 422/165 |
| 5,772,242 | * 6/1998 | Ueda et al. | 280/741 |
| 5,782,487 | * 7/1998 | Bauer et al. | 280/741 |
| 5,797,624 | * 8/1998 | Lang et al. | 280/741 |
| 5,806,887 | * 9/1998 | Tanaka et al. | 280/741 |
| 6,000,718 | * 12/1999 | Krupp | 280/736 |

FOREIGN PATENT DOCUMENTS

| | | |
|---|---|---|
| 2518460 | 3/1977 | (DE) . |
| 4338536 | 5/1995 | (DE) . |
| 0589152 | 3/1994 | (EP) . |

\* cited by examiner

Primary Examiner—Charles T. Jordan
Assistant Examiner—Glenda L. Sánchez
(74) Attorney, Agent, or Firm—Tarolli, Sundheim, Covell, Tummino & Szabo L.L.P.

(57) ABSTRACT

The invention refers to a gas generator for a safety device in motor vehicles, comprising a housing, a cover closing the housing, a propellant container arranged in the housing, and a filling body arranged between the propellant container and the cover or the housing, wherein the filling body is formed of an elastic material and adheres to the propellant container and the cover or the housing, thereby connecting the propellant container and the cover or the housing.

9 Claims, 1 Drawing Sheet

GAS GENERATOR

Figure 1:
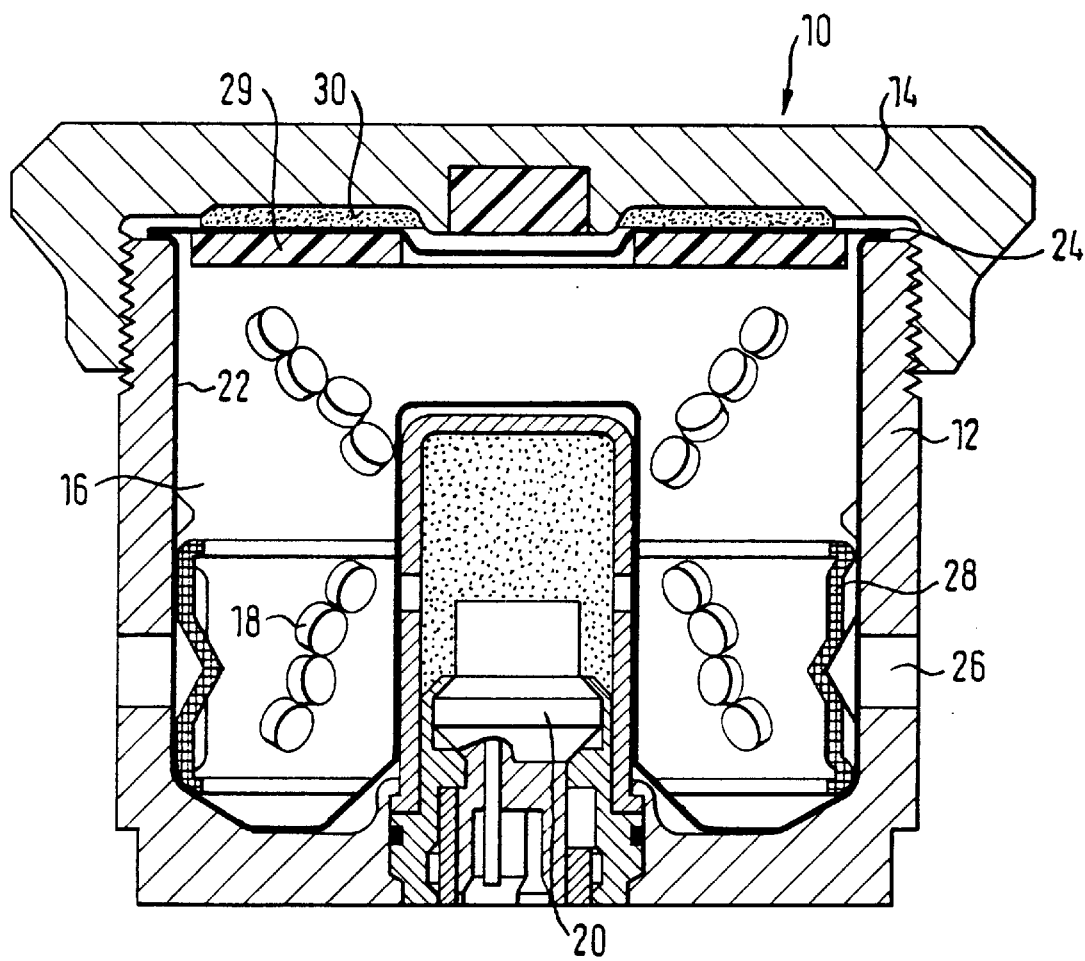

The invention relates to a gas generator for a safety device in motor vehicles, in particular for use in a vehicle occupant restraint system.

Gas generators for safety devices generally comprise a housing, a combustion chamber introduced into the housing with solid propellant to generate hot gas, and also a device for filtering and cooling the hot gases released from the solid propellant. The solid propellant is ignited by an ignition unit inserted into the housing or into a housing cover, and is supplied via outflow openings in the housing for example to the airbag of the safety device.

It is known, in order to prevent rattling noises and to balance out changes in volume of the propellant filling, to introduce elastic filling bodies into the combustion chamber. These filling bodies can be formed from wire netting, wire cloth, metal mesh, clamping plates, mineral fibers or ceramic fibers or else from punched silicone foam. The use of these known filling bodies is, however, linked with various disadvantages.

In filling bodies of wire netting, wire cloth, clamping plate or metal mesh, the metallic material which is used acts as a cooling body and thus influences the burning behavior of the solid propellant. To introduce these filing bodies into the gas generator housing, complicated devices are required. With a change in the dimensions of the gas generator housing, in addition new components are necessary. The fixing of the propellant or of a propellant container in the gas generator housing takes place by elastic force and hence by a generally punctiform stressing of the propellant or of a propellant container. Hereby, the danger exists of damage to the propellant granulate and/or to the propellant container. On assembly of the gas generator, by screwing of the housing with a cover, the filling body can turn and thus generate a force counteracting the screwing. Finally, sharp component edges on the filling body additionally increase the risk of damaging threads or other components in the gas generator housing.

Filling bodies of mineral- or ceramic fibers have only a small elasticity, compressibility and restoring force and thus do not ensure a sufficient fixing of the propellant or of the propellant container with respect to slipping. The filling bodies of punched silicone foam which are likewise used have relatively high material costs and must likewise be adapted in a costly manner to altered gas generator dimensions.

It is an object of the invention to avoid the above-mentioned disadvantages and to make available a gas generator in which in a simple and favorably-priced manner the occurrence of rattling noises is prevented.

This problem is solved according to the invention by a gas generator for a safety device in motor vehicles, comprising a housing, a cover closing the housing, a propellant container arranged in the housing, and a filling body arranged between the propellant container and the cover or the housing, wherein the filling body is formed of an elastic material and adheres to the propellant container and the cover or the housing, thereby connecting the propellant container with the cover or with the housing.

According to a particular embodiment of the invention, the filling body is formed from a sealing material based on silicone. This sealing material is preferably applied in pasty form onto the cover before the assembly of housing, propellant container and cover, and at least partially or totally hardens after the assembly of the gas generator. The connection achieved thereby between cover and/or housing on the one hand and propellant container on the other prevents a dislocation of the propellant container as well as the occurring of rattling noises.

A further particular embodiment of the invention is distinguished in that the propellant container has a folded- or weld seam and the filling body connects the propellant container with the cover in the region of the folded- or weld seam. Hereby, without additional measures, the Lightness of the propellant container is increased. The usual high requirements with regard to the tightness of the folded- or weld seam in hygroscopic propellants are dispensed with. Furthermore, the sealing material may also be applied such that it additionally spreads in the thread region of cover and housing, respectively.

To produce the gas generator according to the invention, the filling body is injected in the form of a pasty viscous material, for example of a sealing material based on silicone, as is obtainable under the commercial name Loctite by the company Loctite Deutschland GmbH, in the form of a bead onto the cover and/or the propellant container inserted into the housing. After the joining together of housing and cover, the sealing material hardens preferably anaerobically, in order to avoid an unwanted hardening in the case of standstills in production. It has been found that the adherence achieved by the sealing material is satisfactory even in the case of partial hardening, for example a hardening in the regions of the sealing material adjoining the joining place between cover and housing. During the joining together of housing and cover, for example by screwing, the sealing material is distributed uniformly on the component, excess material being forced into cavities.

Advantageously, therefore, only a small and uniform resistance is to be overcome during screwing. Likewise, in contrast to the filling bodies known from the prior art, the danger of tilting or damaging of threads in the housing does not exist. Also the danger of damage to the propellant container is substantially reduced, because the pasty filling body acts as a lubricating film between the components.

The at least partially hardened filling body connects the propellant container elastically with the cover or with the housing and therefore represents a secure fixing with respect to slipping. Hence, rattling noises are suppressed in a reliable manner. Through the continuous elasticity of the sealing material, the propellant container is securely embedded and protected against vibrations. With alterations to the housing dimensions, through an altered setting of pumps and dosing valves, an adaptation of the quantity of sealing material can be achieved in a simple manner. Thus, no costly alterations to the production process are necessary. Finally, the filling body according to the invention is also able to be produced at substantially lower costs.

Figure 2:
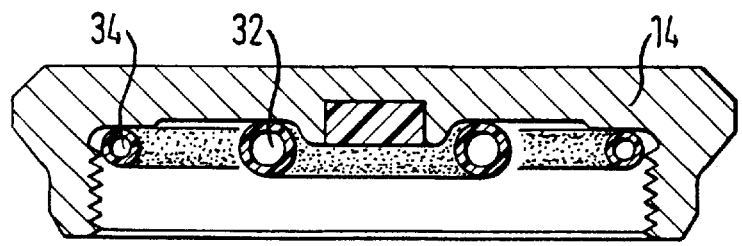

Further features of the invention will be apparent from the following description of preferred embodiments and from the drawing, to which reference is made. In the drawing:

FIG. 1 shows a diagrammatic illustration of the gas generator according to the invention; and FIG. 2 shows the illustration of a housing cover with filling body applied according to the invention.

FIG. 1 shows the illustration of a gas generator 10 according to the invention. The gas generator has a housing 12 and a cover 14 screwed to the housing. In the housing 12 a combustion chamber 16 with solid propellant 18 is constructed, into which an ignition unit 20 projects. The solid propellant 18 is introduced into a propellant container 22 which surrounds the propellant in an air- and gas-tight manner. The weld- or folded seam 24 provided in the propellant housing 22 is preferably arranged in a region of the propellant container 22 lying opposite the housing cover 14. The propellant container 22 is preferably formed from a metal sheet or a metal foil, for example of aluminum or copper, and can be at least partially evacuated after the filling of the propellant 18.

The housing has in addition outflow openings 26 through which the hot gas released from the propellant 18 on triggering of the gas generator 10 is supplied to the airbag (not shown here) of a safety device. Filters 28 are arranged in front of the outflow openings 26. In addition, elastic volume equalizing means 29 are provided in the propellant container, which in a known manner balance out fluctuations of the quantity of propellant filled into the container 22.

A filling body 30 of an elastic material, preferably a sealing material based on silicone, is introduced between the propellant container 22 and the cover 14. The elastic filling body adheres to the propellant container 22 and the cover 14, and preferably to parts of the gas generator housing 12, as well. Thereby, the propellant container 22 is fixed firmly and elastically in the housing 12 and thus prevents the occurrence of rattling noises.

FIG. 2 shows a diagrammatic illustration of the housing cover 14 before the joining together of cover 14 and housing 12. The filling body is preferably applied in the form of a bead 32 as a pasty viscous material onto the cover. Particularly preferably, a second filling body bead 34 can be applied in the peripheral region of the cover 14, which bead 34 connects the propellant container 22 in the region of the weld seam 24 with the cover 14 after the joining together of cover 14 and housing 12 of the gas generator 10, and which preferably spreads in the thread region, as well. Hereby, an additional sealing of the weld seam is ensured, so that the requirements with regard to tightness can be reduced in the embodiment of the weld seam. Of course, the first sealing material bead 32 can also be completely replaced by the second sealing material bead 34.

The gas generator according to the invention is able to be produced at a favorable cost and ensures a rapid and secure adaptation to altered housing dimensions. Rattling noises occurring through vibrations of the propellant container are prevented by means of secure and elastic fixing of the propellant container on the housing cover and, if necessary, on parts of the housing 12. The risk of damage to the propellant canister is almost ruled out by the viscous consistency of the sealing material on assembly of the gas generator. This therefore also makes possible the use of thinner metal foils for the propellant container and thus leads to further savings of material and hence to lower costs. Finally, the expenditure of force for screwing tight the cover with the housing is smaller.

What is claimed is:

1. A gas generator for a safety device in motor vehicles, comprising a housing, a cover closing the housing, a propellant container arranged in the housing, and a filling body arranged between the propellant container and the cover or the housing, wherein the filling body is formed of an elastic material and adheres to the propellant container and the cover or the housing, thereby connecting the propellant container and the cover or the housing.

2. The gas generator according to claim 1, wherein the filling body is formed from a sealing material based on silicone.

3. The gas generator according to claim 1, wherein the filling body is applied in pasty form onto the cover before the assembly of housing, propellant container and cover, and at least partially or totally hardens after assembly.

4. The gas generator according to claim 1, wherein the propellant container has a folded- or weld seam and the filling body connects the propellant container with the cover in the region of the folded- or weld seam.

5. The gas generator according to claim 1, wherein the filling body connects the propellant container with the cover.

6. A method for manufacturing a gas generator for a safety device in motor vehicles, comprising a housing, a cover closing the housing, and a propellant container arranged in the housing, the method comprising the following steps:

applying a pasty and viscous material onto the cover; and screwing tight the cover with the housing.

7. The method according to claim 6, wherein the pasty and viscous material is a sealing material based on silicone.

8. The method according to claim 6, wherein the sealing material is hardened anaerobically.

9. The method according to claim 6, wherein the pasty and viscous material is applied in a peripheral region of the cover.

\* \* \* \* \*